Figure 1:
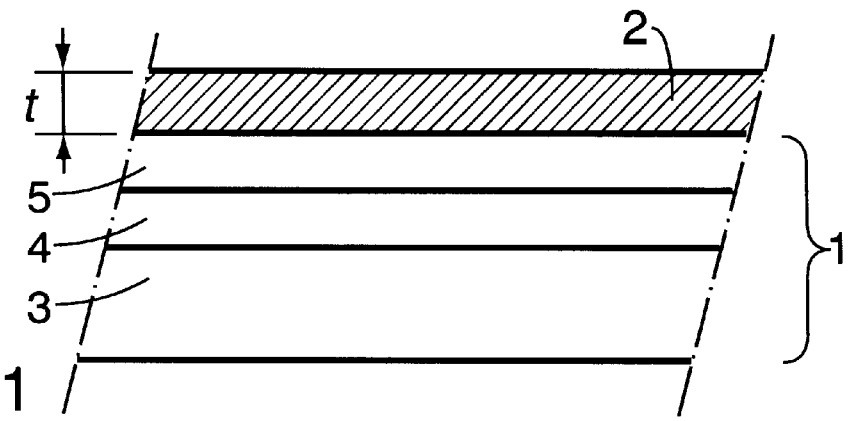
Figure 2A:
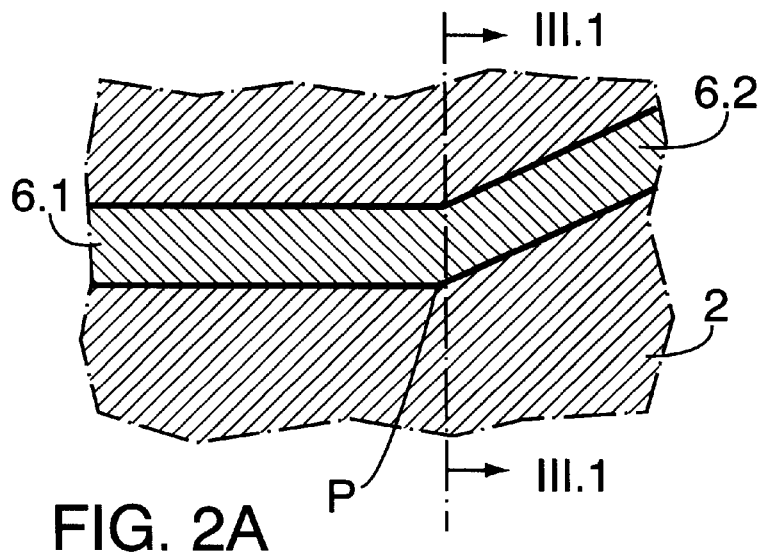
Figure 3A:
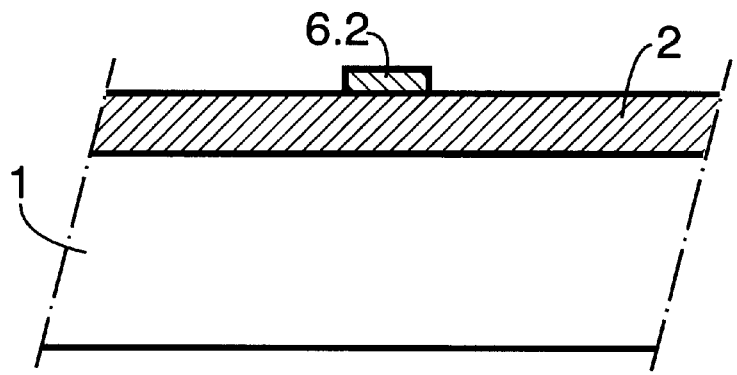
Figure 2B:
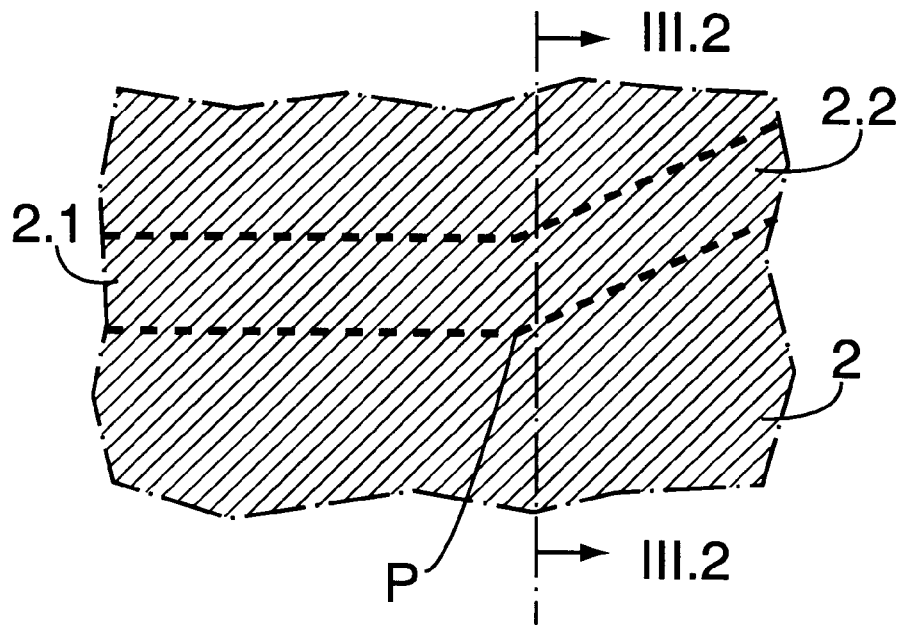
Figure 3B:
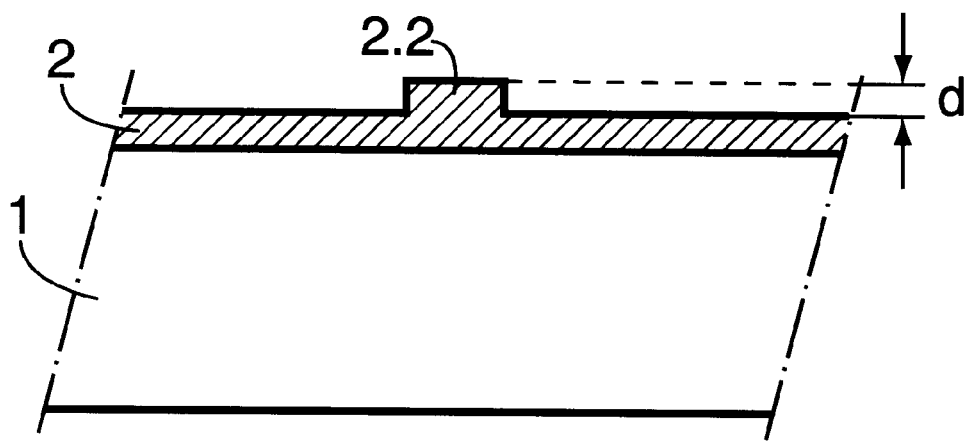
Figure 2C:
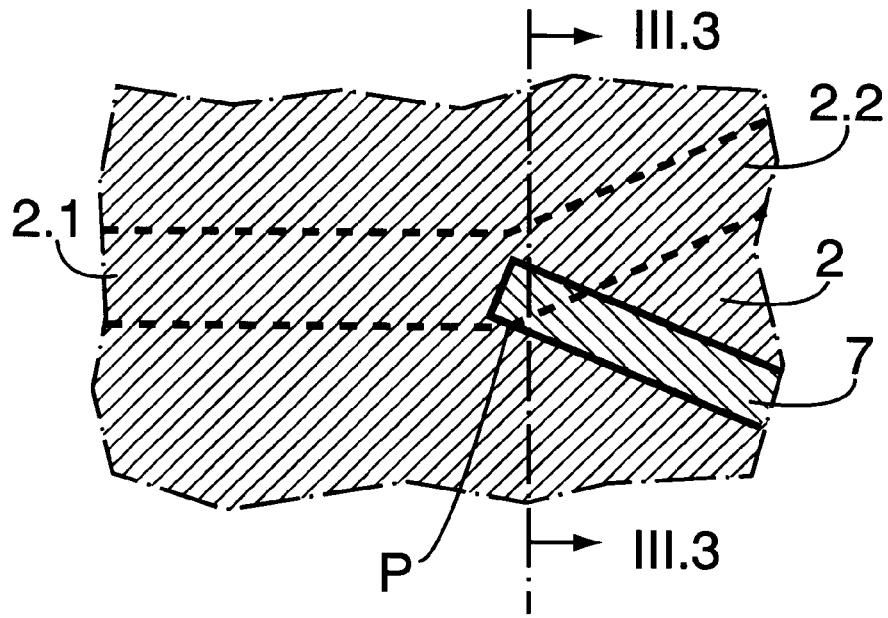
Figure 3C:
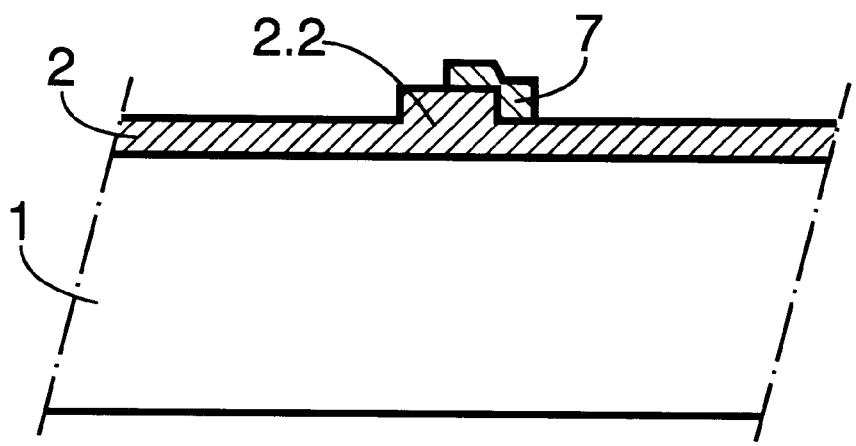
Figure 2D:
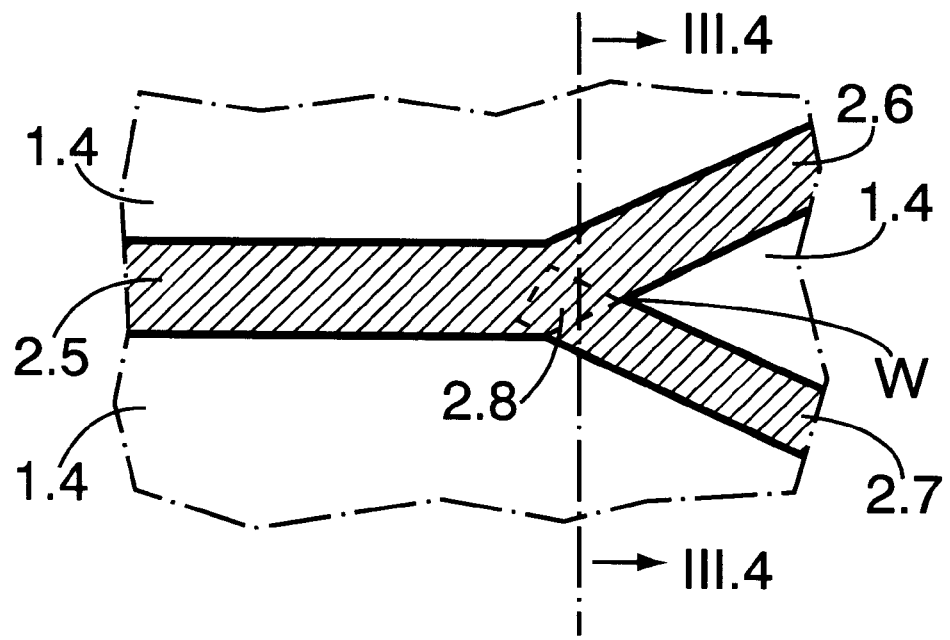
Figure 3D:
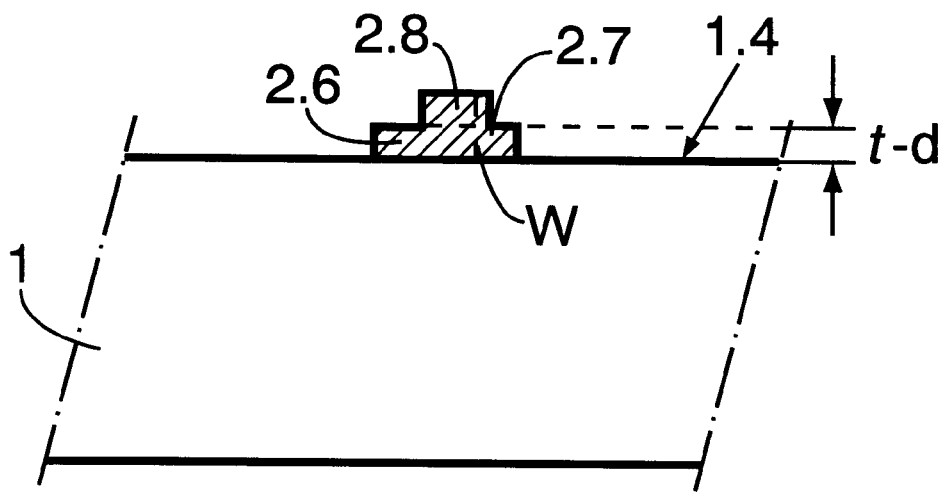
Figure 2E:
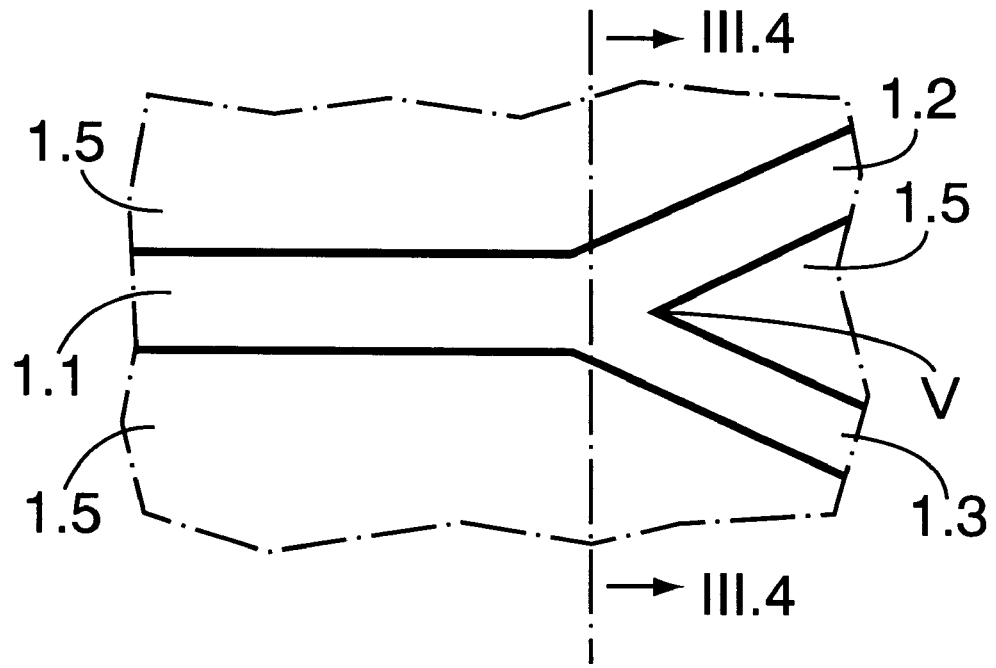
Figure 3E:
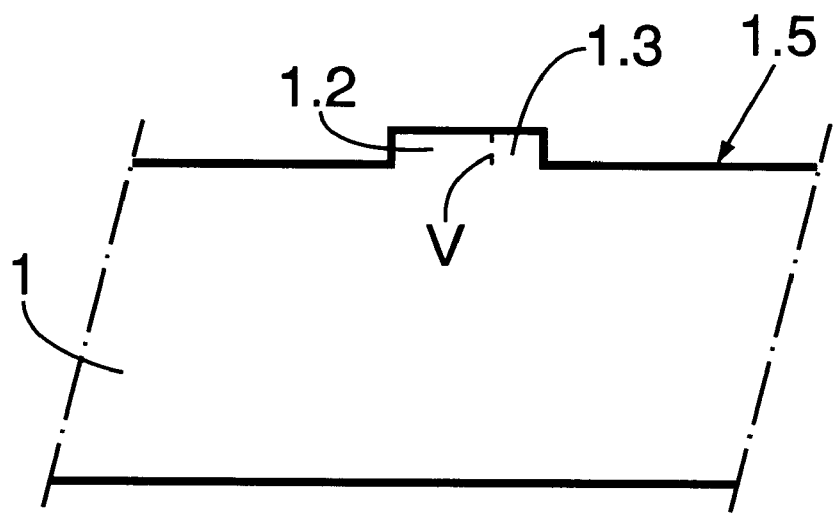

United States Patent [19]
Van Der Tol et al.

[11] Patent Number: 5,922,216
[45] Date of Patent: Jul. 13, 1999

[54] METHOD FOR MANUFACTURING SHARP WAVEGUIDE BRANCHES IN INTEGRATED OPTICAL CIRCUITS

[75] Inventors: Johannes Jacobus Gerardus Maria Van Der Tol, Zoetermeer; Jørgen Werngreen Pedersen, Delft; Fokke Hendrik Groen, Berkel En Rodenrijs, all of Netherlands

[73] Assignee: Koninklijke Ptt Nederland N.V., Netherlands

[21] Appl. No.: 08/752,280

[22] Filed: Nov. 19, 1996

[30] Foreign Application Priority Data

Nov. 29, 1995 [NL] Netherlands ............................ 1001777

[51] Int. Cl.$^6$ ................................ G02B 6/12; C23F 1/18; B44E 1/22; H01L 21/306
[52] U.S. Cl. ............................ 216/17; 428/901; 430/316; 156/633.1; 156/651.1; 156/654.1
[58] Field of Search .......................... 216/2, 17; 428/901; 430/316; 156/633.1, 651.1, 654.1

[56] References Cited

FOREIGN PATENT DOCUMENTS

| 0 599 394 | 6/1994 | European Pat. Off. . |
| 0 645 650 | 3/1995 | European Pat. Off. . |
| 0 668 516 | 8/1995 | European Pat. Off. . |

*Primary Examiner*—John M. Ford
*Attorney, Agent, or Firm*—Michaelson & Wallace; Peter L. Michaelson; John C. Pokotylo

[57] ABSTRACT

A method for manufacturing branching-off or intersecting channel-shaped waveguides on or in a substrate, which substrate encloses a light-guiding layer, and on which substrate there is applied an auxiliary-mask layer having a thickness t, the method comprising steps of:

applying a first mask pattern of a first mask material in a first mask position on the auxiliary-mask layer, the first mask pattern including a subpattern for defining a first channel-shaped waveguide;

etching portions of the auxiliary-mask layer not covered by the first mask pattern using first etchants, the auxiliary-mask material being etched over a first etching depth d which is less than the thickness t;

removing the first mask material of the first mask pattern;

applying a second mask pattern of a second mask material in a second mask position which overlaps the position of the auxiliary-mask pattern at least in part, the second mask pattern including a subpattern for defining a second channel-shaped waveguide which makes an acute angle with the first waveguide; and a second etching step for etching portions of the auxiliary-mask material not covered by the second mask material of the second mask pattern using second etchants, the auxiliary-mask material being etched over a second etching depth t–d, wherein portions of the auxiliary-mask layer not covered by the second mask material and that were not covered by the first mask material are removed such that the surface of the substrate is reached.

10 Claims, 6 Drawing Sheets

5,922,216

METHOD FOR MANUFACTURING SHARP WAVEGUIDE BRANCHES IN INTEGRATED OPTICAL CIRCUITS

A. BACKGROUND OF THE INVENTION

The intention lies in the field of manufacturing integrated optical components. More in particular, it relates to a method for manufacturing branching-off or intersecting channel-shaped waveguides on or in a substrate, which substrate encloses a light-guiding layer, and on which substrate there is applied an auxiliary-mask layer, which method comprises the following steps:

a first application step for applying a first mask pattern of a first mask material in a first mask position on the auxiliary-mask layer, which first mask pattern comprises a subpattern for the definition of a first channel-shaped waveguide, a first etching step for etching portions of the auxiliary-mask layer not covered by the first mask pattern with the help of first etchants, a removal step for removing the first mask material of the first mask pattern, with an auxiliary-mask pattern of auxiliary-mask material remaining on the substrate, a second application step for applying a second mask pattern of a second mask material in a second mask position which overlaps the position of the auxiliary-mask pattern at least in part, which second mask pattern comprises a sub-pattern for the definition of a second channel-shaped waveguide which makes an acute angle with the first waveguide, a second etching step for etching portions of the substrate not covered by mask material with the help of second etchants, an intermediate etching step carried out between the first and the second etching step with the help of third etchants.

Such a method is disclosed in the European patent specification EP-A-0599394. In this known method, there is, first realized a composite mask pattern which consists of an auxiliary-mask pattern formed by the first mask pattern transferred to the auxiliary-mask material of the auxiliary-mask layer, and a second mask pattern of photosensitive mask material overlapping the auxiliary-mask pattern. Said composite mask pattern is then used in the second etching step, the actual etching step for etching the substrate. Said known method has the restriction that for a good result it is required that the materials of the auxiliary-mask layer and of the second mask pattern be sufficiently resistant to the etchants used in the second etching step. Such is not always feasible in practice. Thus, it has become apparent that an accepted photosensitive mask material, such as photoresist, is not sufficiently resistant under a dry-etching step, such as, e.g., with an oxygen plasm, with which the substrate of a semiconductor material, such as InP, is etched.

B. SUMMARY OF THE INVENTION

The object of the invention is to provide a method of the kind mentioned above, which does not have the restriction referred to. In this connection, it first realizes a complete mask pattern in an auxiliary-mask layer, which is then transferred to the substrate. For this purpose, the method of the kind referred to above according to the invention is a method wherein during the first etching step the auxiliary-mask material of the auxiliary-mask layer is etched over a first etching depth; wherein the intermediary etching step is carried out after the application of the second mask pattern, and wherein during the intermediate etching step the portions of the auxiliary-mask material not covered by the second mask material of the second mask pattern are etched over a second etching depth. The sharp vertex is therefore first realized in the auxiliary-mask layer and only then in the substrate. The advantage hereof is that the etching step in which the substrate material is etched, may optionally be carried out wet- or dry-chemically since, due to the absence of photosensitive mask material in the last etching step, the risk of underetching, which exists for wet-chemical etching, is much less. In addition, the etchants used in this connection are less selective.

Further embodiments of the method according to the invention are summarized in the subclaims.

The European patent specification referred to above is considered incorporated into the present application.

C. BRIEF DESCRIPTION OF THE DRAWING

Figure 4:
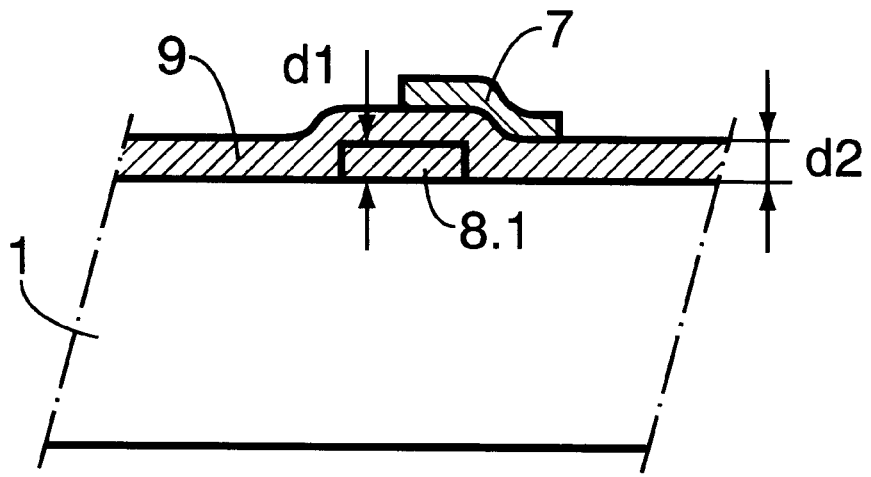
Figure 5:
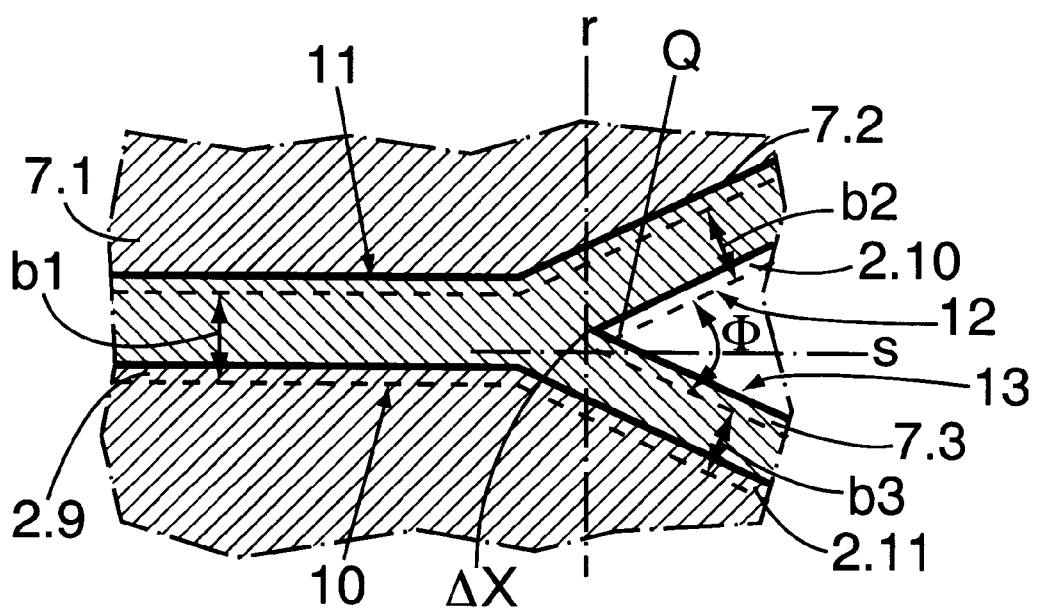

The invention will be explained in greater detail by means of a description of an exemplary embodiment, reference being made to a drawing comprising the following figures:

FIG. 1 shows, in cross section, a layer stack which according to the method of the invention is processed for realizing a Y-shaped waveguide pattern having a sharp vertex;

FIG. 2 comprises subfigures FIGS. 2.1 to 2.5 inclusive which successively show, in plan view, the layer stack according to FIG. 1 in four different processing stages;

FIG. 3 comprises subfigures FIGS. 3.1 to 3.5 inclusive which successively show, in cross section, the layer stack along the lines III.1—III.1 to III.5—III.5 inclusive denoted in the subfigures FIGS. 2.1 to 2.5 inclusive;

FIG. 4 shows, in a variant of the method according to the invention, a cross section of the layer stack in a stage in accordance with the stage shown in FIG. 3.3; and FIG. 5 shows, in a further variant of the method according to the invention, a plan view of the layer stack in a stage in accordance with the stage shown in FIG. 2.3.

D. DESCRIPTION OF AN EXEMPLARY EMBODIMENT

Channel-shaped waveguides in integrated optical circuits are mostly manufactured by means of etching ridge-type patterns in or on a substrate, mostly a layer stack, of suitable transparent materials. Many transparent materials applied are crystalline. Etching processes in such materials may be carried out wet-chemically and in the dry. In crystalline materials, a wet-chemical etching process progresses isotropically or by way of crystal planes, while a dry-etching process may always be carried out specifically. The method according to the invention is basically feasible both with wet-chemical and dry-etching processes, all this of course depending on, and due to, the substrate material applied and the waveguide patterns to be realized therein. The embodiment of the method described below is directed, by way of example only, at the application of dry-etching techniques to a III–V semiconductor material. The example relates to the manufacture of a ridge-type wave-guiding Y-junction with a sharp vertex, based on an InP substrate, with an RIE process (RIE=Reactive Ion Etching) being applied.

FIG. 1 shows, in cross section, a layer stack to be processed, comprising a substrate 1 based on InP, on which there is applied a thin auxiliary-mask layer 2 of $SiO_2$. The substrate 1 comprises a base layer 3 of InP, a light-guiding layer 4 of InGaAsP, and a top layer 5 of InP. The top layer 5 is the layer which must be provided with a pattern of ridges defining the desired waveguide pattern, in this case a waveguiding Y-junction, in the light-guiding layer. The auxiliary-mask layer 2 has a thickness t.

FIG. 2 having subfigures FIGS. 2.1 to 2.5 inclusive, and FIG. 3 having subfigures FIGS. 3.1 to 3.5 inclusive, successively show various processing stages of the layer stack. Each subfigure FIG. 2.i (i=1, . . . ,5) shows the layer stack in a plan view, while the corresponding subfigure 3.i shows the layer stack in a cross section along the line III.i—III.i. On the auxiliary-mask layer 2 there is applied, by means of a photolithographic process, a first mask pattern 6 in photoresist. Said first mask pattern 6 comprises a portion of a Y-shaped pattern, in this example the trunk 6.1 and a branch 6.2 thereof, which together form a pattern for a channel-shaped waveguide having a bend in point P. This stage—a first stage—is shown in FIG. 2.1 and FIG. 3.1.

Subsequently, in a first etching step of dry-etching the auxiliary-mask layer 2, i.e., the portions of the auxiliary-mask layer 2 not covered by the first mask pattern 6, is etched down to a depth d. Then the photoresist of the first mask pattern 6 is removed. In the auxiliary-mask layer 2, however, there remain ridge-type elevations 2.1 and 2.2 as an impression of the first mask pattern 6. This stage—a second stage—is shown in FIG. 2.2 and FIG. 3.2.

As the next step there is applied, on the substrate 1 by means of a second photolithographic process, a second mask pattern of photoresist, which partly overlaps the ridge-type elevations 2.1 and 2.2 as an impression of the first mask pattern 6 in the auxiliary-mask layer 2. The second mask pattern comprises a straight strip 7 for the definition of a straight channel-shaped conductor. The straight strip 7 near the bend P intersects, in an overlapping manner, with the ridge-type elevation 2.2 of the impression in the auxiliary-mask layer 2 at an acute angle. This stage is shown in FIG. 2.3 and FIG. 3.3.

The auxiliary-mask layer 2, i.e., the portions of the auxiliary-mask layer 2 not covered by the second mask pattern of photoresist, in this case the straight strip 7, is subsequently further etched, in a second etching step, which is preferably carried out with the same means as the first etching step, over a depth t–d, until a surface 1.4 of the substrate of InP is reached. Then the photoresist of the second mask pattern, in this case the straight strip 7, is removed. This stage—a third stage—is shown in FIG. 2.4 and FIG. 3.4. On the substrate surface 1.4, of the auxiliary-mask material of the original auxiliary-mask layer there have remained only strips 2.5, 2.6 and 2.7 of thickness t–d, as the respective impressions of the ridge-type elevations 2.1 and 2.2, and the straight strip 7. Only in a zone where, in the third stage, the straight strip 7 has overlapped the ridge-type elevations 2.1 and 2.2, the auxiliary-mask material still has an additional elevation 2.8 of the original thickness t. The strips 2.5, 2.6 and 2.7 (including the additional elevation 2.8) form a Y-shaped mask pattern of exclusively the auxiliary-mask material, which in fact already shows a sharp vertex W.

Said sharp vertex W is transferred in a next, third etching process, with the Y-shaped mask pattern being used as a mask, to the InP material of the substrate 1. Finally, the residues of the auxiliary-mask layer 2 are removed. This latter stage—a fifth stage—is shown in FIG. 2.5 and FIG. 3.5. Here, the ridge of the trunk of the Y-shaped waveguide pattern is denoted by 1.1, the ridge of the first branch by 1.2, the ridge of the second branch by 1.3, and the etched top surface of the substrate by 1.5. Between the first branch 1.2 and the second branch 1.3, there has been produced a sharp vertex V.

The mask patterns of photoresist are applied and removed again according to conventional photolithographic processes. The etching processes of the first and second etching steps, in which the auxiliary-mask material silicon dioxide ($SiO_2$) is etched, may be carried out in an RIE process with fluor-containing gases such as $CHF_3$. Dry-etching indium phosphide may be carried out in an RIE process with a $CH_4/H_2$ gas mixture. The silicon-dioxide residues may be removed with an HF solution or a $CHF_3$ etching process.

The auxiliary-mask layer of silicon dioxide may be applied to the substrate using various techniques, such as vapor deposition, sputtering, or using a PECVD (Plasma-enhanced Chemical Vapor Deposition) process.

Instead of silicon dioxide, other dielectric materials, which are conventionally applied as mask materials in the event of integration techniques for manufacturing components based on III–V semiconductor materials, such as silicon nitride ($Si_3N_4$) and silicon oxynitride, a hybrid of silicon nitride and silicon dioxide may be used.

The thickness t of the auxiliary-mask layer and the etching depth d in the first etching step are not critical. The auxiliary-mask layer, e.g., has a thickness t=approx. 200 nm, which in the first etching process is etched away to roughly half.

In lieu of one auxiliary-mask layer with a relatively large thickness (e.g., 200 nm), there may also be applied two auxiliary-mask layers, preferably of the same material and roughly equal in thickness (approx. 100 nm). A first auxiliary-mask layer 8 of thickness d1 is applied to the substrate 1 prior to the application of the first mask pattern having portions 6.1 and 6.2 of photoresist. In the first etching process, etching is then carried out down to the surface of the substrate (therefore etching depth d1 is approx. 100 nm). A second auxiliary-mask layer 9 is applied after the removal of the first mask pattern, on the substrate 1 on top of residues 8.1 of the first auxiliary-mask layer 8. Subsequently, the second mask pattern of photoresist is applied, including the straight strip 7. FIG. 4 shows the layer stack in this processing stage. Thereafter, the method is continued using the subsequent steps described above.

The third etching step may, instead of using dry etching, also be carried out using wet-chemical etchants. Suitable selective etching liquids for etching the indium-phosphide surface are, e.g., $HCl:H_3PO_4$ or $C_3H_8O_3:HCl.HClO_4$.

The method described may be applied, by suitably dimensioning the mask patterns, for the manufacture of branching-off waveguide structures requiring sharp vertices, such as 3 dB splitters, asymmetrical Y-splitters, power couplers. For structures having multiple branches, such as 1×N and M×N splitters which are composed of Y-shaped branches, the method is also applicable: by always having, in each Y-shaped branch of such a composite structure, one waveguide branch defined by one and the same first mask pattern and the other waveguide branch by one and the same second mask pattern.

A sharp vertex may also be obtained if the subpattern of the first mask pattern defines a complete Y-shaped waveguide structure, the subpattern of the second mask pattern is equal to the subpattern of the first mask pattern, and the subpattern of the second mask pattern is applied at a mask position which is displaced somewhat with respect to the mask position of the subpattern of the first mask pattern. The direction in which the displacement is/has been effected must be such that a situation corresponding to the stage shown in FIG. 2.3 may therewith occur in an area around the location where a sharp vertex must be produced. A processing stage of the layer stack after the application of the second mask pattern, with the first and the second mask pattern comprising an identical Y-shaped subpattern, is shown in FIG. 5. After the first etching step there have remained, in the auxiliary-mask layer 2, ridge-type elevations 2.9, 2.10 and 2.11 as an impression of the first mask pattern, which elevations form a Y-shaped relief 10 (broken-dashed-line pattern) in the auxiliary-mask material of the auxiliary-mask layer 2. The ridge-type elevations 2.9, 2.10 and 2.11 have respective ridge widths b1, b2 and b3. The ridge-type elevations 2.10 and 2.11 have an angle Φ. On top of the Y-shaped relief 10, there is applied the second mask pattern of photoresist. The second mask pattern comprises substrips 7.1, 7.2 and 7.3, which form a Y-shaped subpattern 11 of the same dimensions as the Y-shaped relief 10. The substrips 7.2 and 7.3 have the same angle Φ as the ridge-type elevations 2.10 and 2.11. The Y-shaped subpattern 11 lies in a somewhat displaced position on top of the Y-shaped relief 10. Said displaced position is such that an inner edge 12 of the ridge-type elevation 2.10 and an inner edge 13 of the substrip 7.3 intersect in a point Q. The Y-shaped subpattern 11 of the second mask pattern is preferably applied in a position displaced (according to a translation) over a spacing Δx along a direction perpendicular to a bisector s of the angle Φ between the ridge-type elevations 2.10 and 2.11. In order for the substrips 7.1, 7.2 and 7.3 to overlap the corresponding ridge-type elevations 2.9, 2.10 and 2.11 at least in part, the spacing Δx must be less than the smallest of the ridge widths b1, b2 and b3.

Such a displacement variant of the method, with two mask patterns having identical Y-shaped subpatterns being applied under mutually displaced positions, is very suitable for the manufacture of sharp vertices in structures having multiple branches, such as 1×N and M×N splitters. A great advantage hereof is that it is not necessary to design two different mask patterns. When dimensioning the design, however, there must be taken into account the fact that the eventual widths of the channel-shaped waveguide patterns to be realized will be inclusive of the displacement.

We claim:

1. A method for manufacturing branching-off or intersecting channel-shaped waveguides on or in a substrate, which substrate encloses a light-guiding layer, and on which substrate there is applied an auxiliary-mask layer having a thickness t, the method comprising steps of:
    applying a first mask pattern of a first mask material in a first mask position on the auxiliary-mask layer, the first mask pattern including a subpattern for defining a first channel-shaped waveguide;
    etching portions of the auxiliary-mask layer not covered by the first mask pattern using first etchants, the auxiliary-mask material being etched over a first etching depth d which is less than the thickness t;
    removing the first mask material of the first mask pattern;
    applying a second mask pattern of a second mask material in a second mask position which overlaps the position of the auxiliary-mask pattern at least in part, the second mask pattern including a subpattern for defining a second channel-shaped waveguide which makes an acute angle with the first waveguide; and
    a second etching step for etching portions of the auxiliary-mask material not covered by the second mask material of the second mask pattern using second etchants, the auxiliary-mask material being etched over a second etching depth t−d, wherein portions of the auxiliary-mask layer not covered by the second mask material and that were not covered by the first mask material are removed such that the surface of the substrate is reached.

2. The method of claim 1 further comprising a step of:
    removing the second mask material of the second mask pattern.

3. The method of claim 2 further comprising steps of:
    etching the substrate using a third etchant; and
    removing any residual material of the auxiliary-mask layer.

4. The method of claim 1 further comprising steps of:
    etching the substrate using a third etchant; and
    removing any residual material of the auxiliary-mask layer.

5. The method of claim 1, wherein
    the first mask pattern comprises a Y-shaped subpattern for defining a waveguide pattern branching off in a Y-shaped manner, which Y-shaped subpattern encloses a trunk part having a first width, and two branch parts connected to the trunk part having a second and a third width, respectively, which branch parts mutually make an acute angle with one another,
    the second mask pattern is substantially equal to the first mask pattern, and
    the second mask position corresponds to a position which is displaced with respect to the first mask position.

6. The method of claim 5, wherein the second mask position is a position which is displaced in a direction substantially perpendicular to a bisector of an acute angle between the two branch parts of the Y-shaped subpattern of the first mask pattern over a spacing less than the smallest of the first, second and third widths.

7. A method for manufacturing branching-off or intersecting channel-shaped waveguides on or in a substrate, which substrate encloses a light-guiding layer, the method comprising steps of:
    applying a first auxiliary mask layer, of a first thickness, to the substrate;
    applying a first mask pattern of a first mask material in a first mask position on the first auxiliary-mask layer, the first mask pattern including a subpattern for defining a first channel-shaped waveguide;
    etching portions of the first auxiliary-mask layer not covered by the first mask pattern using first etchants, the first auxiliary-mask material being etched over a first etching depth of the first thickness such that etching is carried out down to a surface of the substrate;
    removing the first mask material of the first mask pattern;
    applying a second-auxiliary mask layer;
    applying a second mask pattern of a second mask material in a second mask position which overlaps the position of the auxiliary-mask pattern at least in part, the second mask pattern including a subpattern for defining a second channel-shaped waveguide which makes an acute angle with the first waveguide; and
    a second etching step for etching portions of the auxiliary-mask material not covered by the second mask material of the second mask pattern using second etchants, wherein portions of the auxiliary-mask layer not covered by the second mask material and that were not covered by the first mask material are removed such that the surface of the substrate is reached.

8. The method of claim 7 further comprising a step of:
    removing the second mask material of the second mask pattern.

9. The method of claim 8 further comprising steps of:
    etching the substrate using a third etchant; and
    removing any residual material of the auxiliary-mask layer.

10. The method of claim 7 further comprising steps of:
    etching the substrate using a third etchant; and
    removing any residual material of the auxiliary-mask layer.

* * * * *